(12) United States Patent
Zhu et al.

(10) Patent No.: US 9,729,260 B2
(45) Date of Patent: Aug. 8, 2017

(54) REDUCING INTERFERENCE CAUSED BY AN ATMOSPHERIC DUCT IN A MOBILE COMMUNICATION SYSTEM

(75) Inventors: Huaisong Zhu, Beijing (CN); Yang Hu, Beijing (CN); Steve Lou, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 14/000,760

(22) PCT Filed: Feb. 24, 2011

(86) PCT No.: PCT/CN2011/000285
§ 371 (c)(1),
(2), (4) Date: Aug. 21, 2013

(87) PCT Pub. No.: WO2012/113098
PCT Pub. Date: Aug. 30, 2012

(65) Prior Publication Data
US 2013/0322289 A1 Dec. 5, 2013

(51) Int. Cl.
*H04J 3/14* (2006.01)
*H04J 11/00* (2006.01)

(52) U.S. Cl.
CPC ............. *H04J 3/14* (2013.01); *H04J 11/0056* (2013.01)

(58) Field of Classification Search
CPC ............................... H04W 24/00; H04L 43/50
USPC ........ 370/252, 336, 241, 329, 320; 455/450, 455/522
See application file for complete search history.

(56) References Cited

U.S. PATENT DOCUMENTS

| 5,548,837 | A | * | 8/1996 | Hess et al. ................. 455/278.1 |
| 5,946,346 | A | * | 8/1999 | Ahmed et al. ................ 375/219 |
| 6,304,760 | B1 | * | 10/2001 | Thomson ............ H04B 17/309 455/503 |
| 6,456,598 | B1 | * | 9/2002 | Le Strat et al. .............. 370/252 |
| 7,957,743 | B2 | * | 6/2011 | Moe et al. .................... 455/439 |

(Continued)

FOREIGN PATENT DOCUMENTS

| CN | 1533644 A | 9/2004 |
| CN | 1762117 A | 4/2006 |

(Continued)

*Primary Examiner* — Parth Patel
(74) *Attorney, Agent, or Firm* — Coats & Bennett PLLC

(57) ABSTRACT

A base station (14) in a mobile communication system operating according to a synchronized time division scheme comprises an antenna (26), a radio communication unit (24) for communicating with mobile stations of the system and an interference investigating unit (28) comprising a link quality measuring element (30), which obtains link quality measurements that are measured in the base station during uplink communication (UL) between at least one mobile station and the base station, a link quality evaluation element (32) that compares link quality measurements of at least one uplink channel with a link quality threshold and determines that the uplink channel is interfered by another base station if the link quality threshold is exceeded, a base station identifying element (34) that identifies the other base station via signals broadcast by the other base station and an interference limiting element (36) configured to perform an interference limitation activity based on the identification.

24 Claims, 5 Drawing Sheets

(56) References Cited

U.S. PATENT DOCUMENTS

| | | | |
|---|---|---|---|
| 2002/0068566 A1* | 6/2002 | Ohlsson et al. | 455/436 |
| 2003/0003874 A1* | 1/2003 | Nitta et al. | 455/67.1 |
| 2003/0013454 A1* | 1/2003 | Hunzinger | 455/452 |
| 2003/0134655 A1* | 7/2003 | Chen et al. | 455/522 |
| 2004/0179469 A1 | 9/2004 | Attar et al. | |
| 2004/0185864 A1* | 9/2004 | Balachandran et al. | 455/452.2 |
| 2004/0190482 A1 | 9/2004 | Baum et al. | |
| 2004/0259561 A1* | 12/2004 | Stewart et al. | 455/452.2 |
| 2005/0041605 A1* | 2/2005 | Benson | 370/280 |
| 2005/0124369 A1* | 6/2005 | Attar et al. | 455/522 |
| 2006/0068715 A1* | 3/2006 | Hundal et al. | 455/67.11 |
| 2006/0217158 A1* | 9/2006 | Uwano et al. | 455/562.1 |
| 2007/0191013 A1* | 8/2007 | Gunnarsson et al. | 455/438 |
| 2007/0297399 A1* | 12/2007 | Prytz | H04W 28/0236 370/384 |
| 2008/0019289 A1* | 1/2008 | Monden et al. | 370/254 |
| 2008/0064432 A1* | 3/2008 | Park et al. | 455/522 |
| 2008/0102845 A1* | 5/2008 | Zhao | 455/450 |
| 2008/0311924 A1* | 12/2008 | Lucidarme | 455/452.1 |
| 2009/0109939 A1* | 4/2009 | Bhushan et al. | 370/337 |
| 2009/0148058 A1* | 6/2009 | Dane | H04N 5/145 382/251 |
| 2009/0280822 A1* | 11/2009 | Ericson et al. | 455/452.2 |
| 2009/0296635 A1* | 12/2009 | Hui et al. | 370/328 |
| 2009/0325625 A1* | 12/2009 | Hugl et al. | 455/522 |
| 2010/0103867 A1* | 4/2010 | Kishiyama et al. | 370/320 |
| 2010/0202283 A1 | 8/2010 | Tiedemann, Jr. | |
| 2010/0240314 A1* | 9/2010 | Chang et al. | 455/67.11 |
| 2010/0240382 A1* | 9/2010 | Sampath et al. | 455/450 |
| 2011/0105184 A1* | 5/2011 | Piirainen et al. | 455/562.1 |
| 2011/0124345 A1* | 5/2011 | Lee et al. | 455/452.2 |
| 2011/0134865 A1* | 6/2011 | Gaur | 370/329 |
| 2011/0165902 A1* | 7/2011 | Demarez et al. | 455/507 |
| 2011/0201277 A1* | 8/2011 | Eguchi | 455/63.3 |
| 2012/0004002 A1* | 1/2012 | Nanri et al. | 455/509 |
| 2012/0014274 A1* | 1/2012 | Muraoka et al. | 370/252 |
| 2012/0108239 A1* | 5/2012 | Damnjanovic et al. | 455/436 |
| 2012/0122440 A1* | 5/2012 | Krishnamurthy et al. | 455/418 |
| 2012/0164948 A1* | 6/2012 | Narasimha et al. | 455/63.1 |
| 2012/0213095 A1* | 8/2012 | Krishnamurthy et al. | 370/252 |
| 2012/0213096 A1* | 8/2012 | Krishnamurthy et al. | 370/252 |
| 2012/0213107 A1* | 8/2012 | Jang et al. | 370/252 |
| 2013/0279484 A1* | 10/2013 | Duenyas et al. | 370/336 |
| 2013/0301422 A1* | 11/2013 | Caretti et al. | 370/241 |

FOREIGN PATENT DOCUMENTS

| | | |
|---|---|---|
| CN | 1788444 A | 6/2006 |
| CN | 1956342 A | 5/2007 |
| GB | 2472792 A | 2/2011 |
| WO | 2010063137 A1 | 6/2010 |

\* cited by examiner

REDUCING INTERFERENCE CAUSED BY AN ATMOSPHERIC DUCT IN A MOBILE COMMUNICATION SYSTEM

TECHNICAL FIELD

The invention relates to base stations in mobile communication systems. More particularly, the invention relates to a method and computer program product for handling interference in a mobile communication system operating according to a synchronised time division scheme as well as to a base station in a mobile communication system operating according to a synchronised time division scheme.

BACKGROUND

There are today many mobile communication systems that use synchronised time division schemes, such as time division duplexing systems (TDD). One example of this is Time Division-Long Term Evolution (TD-LTE). These types of systems are provided with base stations, which have certain communication structures, such as frames or superframes provided after one another in time. The communication structures of the base stations are in these types of systems synchronised with each other. The base stations of many systems do more particularly often transmit signals in one period of the structure, often denoted downlink period, and receive signals in another period of the structure, often denoted uplink period. These periods should be sufficiently separated from each other in order to avoid that base station transmissions interfere with base station reception. Such a separation is in some systems denoted a guard period. If systems are synchronised this means that all base stations are transmitting at the same time and all are receiving at the same time.

There exist some prior art documents that adjust these communication structures.

WO 2008/103090 does for instance disclose measuring the interference level during part of the time between two consecutive down link periods and varying the duration of guard periods according to the interference level.

WO 2009/153622 describes determining, through an apparatus equipped with a transmitter that monitors signal energy on a shared radio resource, the presence of other transmitters, identification of a predetermined set of time division duplex (TDD) signaling patterns, performing of a correlation between signal energy received on the shared radio resource and the predetermined TDD signaling patterns and determining of a TDD signaling pattern that may reduce or avoid interference with other transmitters using the shared resource.

One problem that has received increased attention lately in relation to systems using synchronised time division schemes are problems caused by atmospheric ducts.

An atmospheric duct is a horizontal layer that is created in the lower atmosphere, typically the troposphere. In such a duct the vertical refractive index gradients are such that radio signals (and light rays) are guided or ducted along the length of the duct. The radio signals in the ducts therefore tend to follow the curvature of the Earth. They also experience less attenuation in the ducts than they would if the ducts were not present.

The occurrences and locations of these ducts are hard to predict. They occur rarely, typically a few days or a number of hours in one year, and also often occur in some special area, like in the desert or near the sea.

For a mobile communication system, an atmospheric duct will cause long-distance downlink (DL) signals for base stations to mobile stations to travel through the atmosphere with long transmission delay but with a very low attenuation.

This delayed but still strong signal may seriously affect TDD system performance.

Since the base stations in the above mentioned systems are supposed to transmit in well controlled periods of the communication structure and to receive signals from mobile stations in other periods of the communication structure, it is possible that the signals from a base station travelling through an atmospheric duct will reach another base station when this other base station is supposed to receive signals from mobile stations, i.e. when this other base station is in uplink communication.

This situation can be serious because base stations transmit with much more power than a mobile station. Since the signals in the atmospheric duct have low attenuations, this means that a base station may not be able to receive any signals from mobile stations in the whole or parts of the period of the communication structure assigned to reception of signals from mobile stations. This means that one of the fundamental base station functions may be impossible to perform.

It is also possible for a base station to interfere with uplink communication of another base station for other reasons, like if it has a faulty operation, like having lost its synchronisation.

There is therefore a need for a solution to this problem.

SUMMARY

The invention is therefore directed towards solving the problem of base station interference in uplink communication in a mobile communication system that uses a synchronised time division communication scheme.

One object of the invention is thus to solve the problem of base station interference in uplink communication in a mobile communication system that uses a synchronised time division communication scheme.

This object is according to a first aspect of the invention achieved through a method for handling interference in a mobile communication system operating according to a synchronised time division scheme. The method is performed in a base station of the mobile communication system and comprises:

obtaining link quality measurements that are measured in the base station during uplink communication between at least one mobile station and the base station, comparing link quality measurements of at least one uplink channel with a link quality threshold, determining that the uplink channel is interfered by another base station if the link quality threshold is exceeded, identifying the other base station via signals being broadcast by the other base station, and performing an interference limitation activity based on the identification.

The object is according to a second aspect of the invention achieved through a base station in a mobile communication system operating according to a synchronised time division scheme. The base station comprises at least one antenna, a radio communication unit for communicating with mobile stations of the system via the antenna and an interference investigating unit. The interference investigating unit in turn comprises a link quality measuring element, which obtains link quality measurements that are measured in the base station during uplink communication between at least one mobile station and the base station, a link quality evaluation element that compares link quality measurements of at least one uplink channel with a link quality threshold and determines that the uplink channel is interfered by another base station if the link quality threshold is exceeded, a base station identifying element that identifies the other base station via signals broadcast by the other base station and an interference limiting element that performs an, interference limitation activity based on the identification.

The above-mentioned object is according to a third aspect of the invention achieved through a computer program product for handling interference in a mobile communication system operating according to a synchronised time division scheme. The computer program product comprises computer program code on a data carrier, which when run on a processor forming an interference investigating unit of a base station, causes the interference investigating unit to:

obtain link quality measurements that are measured in the base station during uplink communication between at least one mobile station and the base station, compare link quality measurements of at least one uplink channel with a link quality threshold, determine that the uplink channel is interfered by another base station if the link quality threshold is exceeded, identify the other base station via signals being broadcast by the other base station, and perform an interference limitation activity based on the identification.

The invention has many advantages. It provides interference limitation in uplink communication, for instance caused by atmospheric ducts, which can cause serious problems. This may also be performed using only slight modifications of existing base stations. The invention is therefore also easy to implement in existing systems.

The system may be a time division duplexing system. It may also be a Universal Mobile Telecommunication System as well as a Long Term Evolution System.

The base station may be a Node B base station and may also be an evolved Node B base station According to one variation the identifying in the method is performed through obtaining an identifier by the other base station.

According to the same variation of the invention the base station identifying element identifies the other base station through obtaining an identifier broadcast by the other base station.

The broadcast identifier may here be a cell identifier. It may particularly be a global cell identifier.

According to another variation of the invention, the identifying being performed in the method comprises monitoring broadcasting being made by the other base station.

According to the same variation of the invention the base station identifying element identifies the other base station through monitoring broadcasting being made by the other base station.

The monitoring may here be performed during a part of the time division scheme allocated to uplink communication.

According to yet another variation of the invention the monitoring comprises ordering a mobile station to monitor and report broadcasting being made by the other base station.

According to the same variation of the invention the base station identifying element may identify the other base station through ordering a mobile station to monitor and report broadcasting being made by the other base station.

The reporting being made by the mobile station may here be a reporting made according to an automatic neighbour relation function.

According to another variation of the invention the method further comprises obtaining a system communication identifier based on the broadcast identifier and using the system communication identifier for communicating with the other base station.

According to the same variation of the invention the base station identifying element obtains a system communication identifier based on the broadcast identifier for use in communication with the other base station.

According to yet another variation of the invention the performing of an interference limitation activity comprises requesting the other base station to perform at least one interference limitation measure According to the same variation of the invention the the interference limiting element, when performing an interference limitation activity, requests the other base station to perform at least one interference limitation measure.

According to a further variation of the invention the performing of an interference limitation activity comprises performing at least one interference limitation measure.

According to the same variation of the invention the interference limiting element, when performing an interference limitation activity, performs at least one interference limitation measure.

An interference limitation measure may here be a measure in the group of adjust antenna tilt, adjust traffic allocation, adjust downlink power and adjust interval between uplink and downlink transmissions It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns a base station in a mobile communication system like Universal Mobile Telecommunication System (UMTS) and/or Long-Term Evolution (LTE). The system is furthermore a system that uses a synchronised time division scheme, such as a time division duplexing system (TDD). In the example of LTE the system may be Time Division-Long Term Evolution (TD-LTE).

Figure 1:
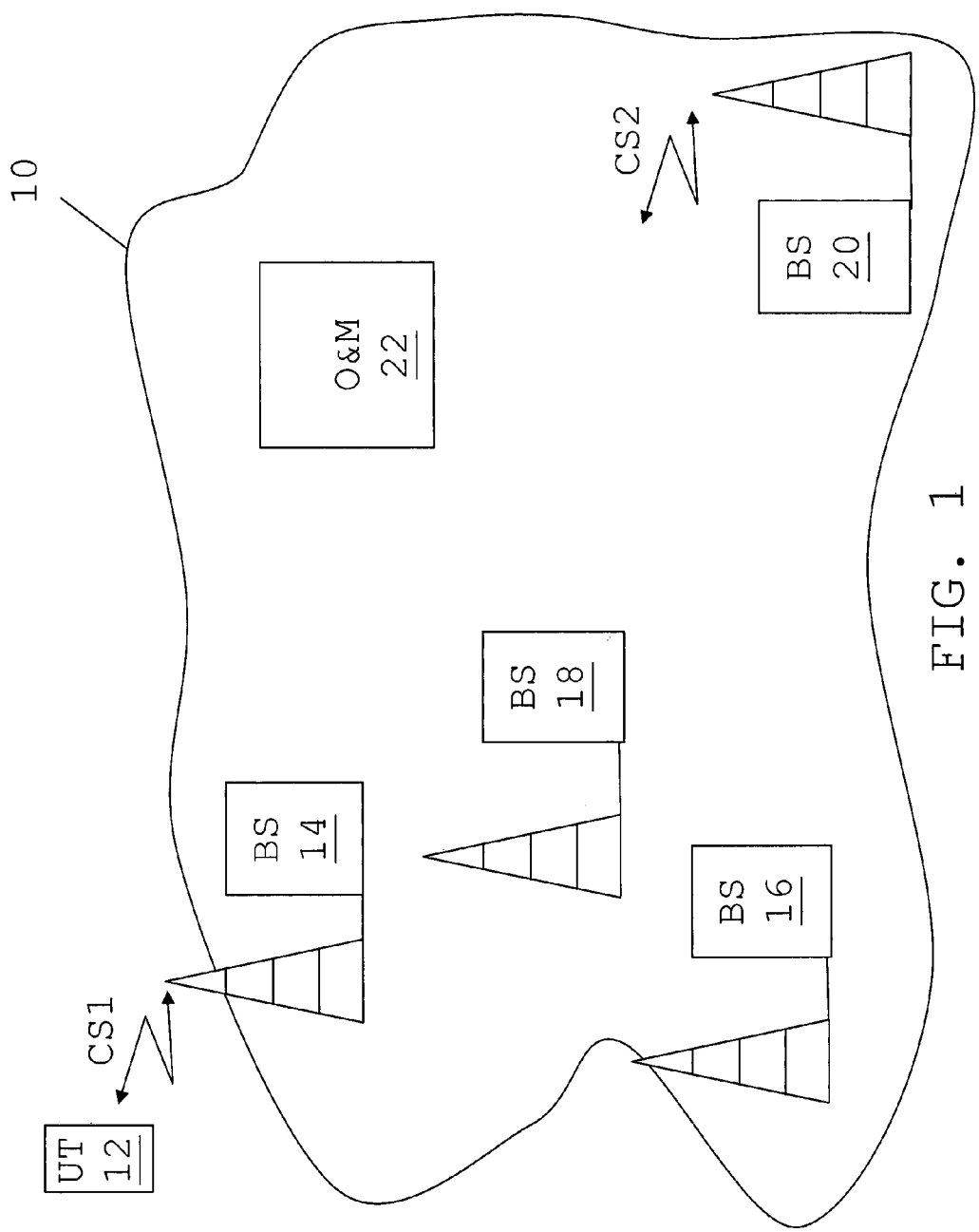
FIG. 1 schematically shows a mobile communication system comprising an O&M device and a number of base stations, where a first base station is communicating with a mobile station.

FIG. 1 schematically shows one exemplifying TD-LTE system 10. In this system there are a number of base stations 14, 16, 18 and 20. Base stations are in mobile communication systems often denoted node B's and in LTE evolved node B's (enodeB). There is here a first group of base stations including a first base station 14, a second base station 16 and a third base station 18. The base stations in this first group are neighbours, which in this case means that they provide cells that are placed adjacent each other. There is furthermore a further base station in the system 10. This further base station 20 is provided on a long distance from the base stations in the first group and particularly on a large distance from the first base station 14. This means that under normal atmospheric situations, the further base station 20 is provided on a large enough distance from the first group of base stations that the transmissions of the further base station 20 are attenuated enough for not influencing the operation of the first group of base stations.

In FIG. 1 there s furthermore indicated a first communication structure CS1 of the first base station 14 in which it is communicating with a mobile station 12 as well as a second communication structure CS2 used by the further base station 20. Also the second and third base stations 16 and 18 have similar communication structures. However, these have here been omitted in order to provide a clearer description of the invention. Furthermore, all the communication structures of the system 10 are synchronised with each other. In FIG. 1 there is furthermore shown an Operations and Maintenance (O&M) device 22, with which the first base station 14 may communicate. This device is a part of an O&M subsystem in the mobile communication system.

Figure 2:
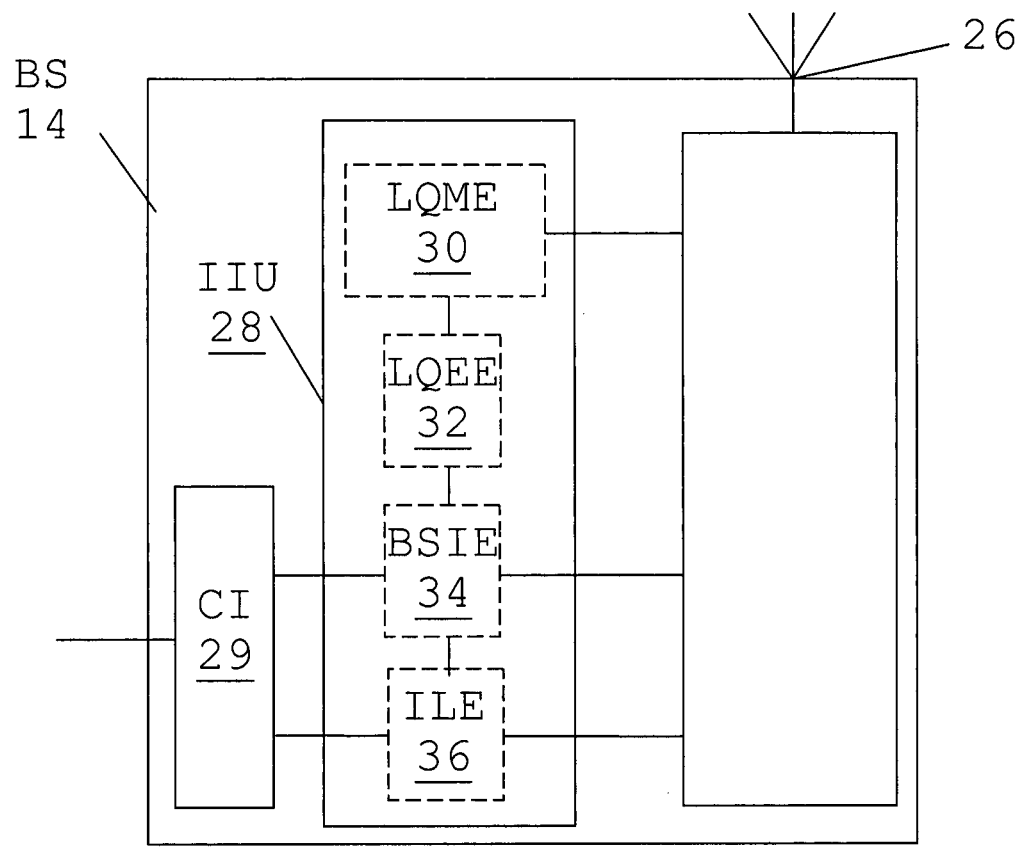
FIG. 2 shows a block schematic of the first base station according to a first embodiment of the invention, FIG. 3 schematically shows an atmospheric duct having been formed in the atmosphere above the earth, FIG. 4 schematically shows the communication structures of two base stations in FIG. 1, the first base station and a further base station, FIG. 5 schematically shows a cell identifier of a systems information block being provided in the communication structure of a base station.

FIG. 2 shows a block schematic of the first base station 14. The first base station comprises a radio communication unit 24 connected to at least one antenna for communicating with mobile stations of the system like the one shown in FIG. 1 via the at least one antenna. In this embodiment there is only one antenna 26. The first base station 14 furthermore comprises an interference investigating unit 28 and a communication interface 29. The communication interface may here include an X2 interface section for communicating with other base stations as well as an S1 interface section for communicating with other devices or nodes in the system, such as the O&M device. The interference investigating unit 28 comprises a number of elements. It includes a link quality measuring element 30, a link quality evaluating element 32, a base station identifying element 34 and finally an interference limiting element 36. Here the link quality measuring element 30 is connected to the radio communication unit 24 and link quality evaluating element 32. Furthermore, the link quality evaluating element 32 is connected to the bas station identifying element 34, which in turn is connected to the radio communication unit 24, the communication interface 29 as well as to the interference limiting element 36. Finally the interference limiting element 36 is connected to the radio communication unit 24 and the communication interface 29.

Figure 3:
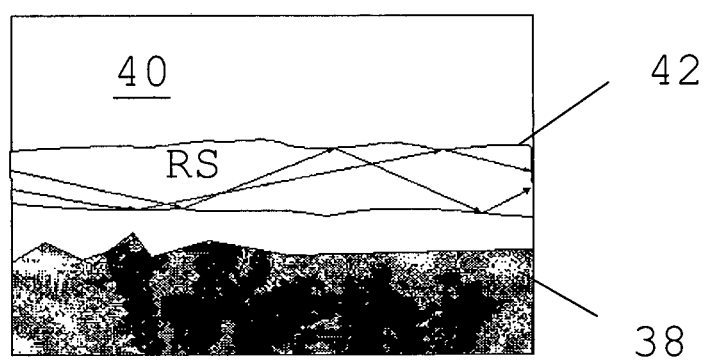

As was mentioned earlier there can at times occur atmospheric ducts in the atmosphere. Such a situation is schematically shown in FIG. 3, which shows an atmospheric duct 42 that has been created in the atmosphere 40 above ground 38. In FIG. 3 there is also shown how radio signals RS propagate in this duct along the length of the duct. Radio signals RS that are transported in this duct 42 can be propagated long distances with low attenuation.

Figure 4:
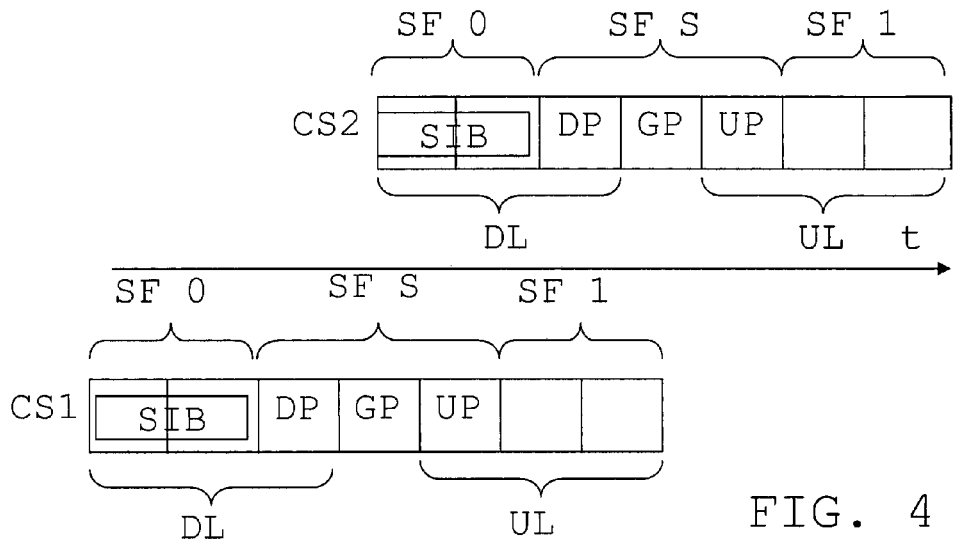

FIG. 4 schematically shows the communication structures CS1 and CS2 of the first and the further base stations shown in FIG. 1. These communication structures CS1 and CS2 are both divided into a number of subframes, and in this example only three are displayed for showing the principle. These subframes follow each other in time. This means that there is here a subframe zero SF 0 followed by a special subframe SF S and a subframe one SF 1. All these subframes are divided into time slices. However, in the figure only three such time slices in the special subframe SF S are indicated by names. Subframe zero SF 0 is here only provided for downlink communication DL, i.e. communication from base station to mobile station, and subframe one SF 1 only for uplink communication UL, i.e. communication from mobile station to base station. In subframe zero SF 0 there is furthermore a system information block SIB being transmitted. The special subframe SF S includes three time slices, a downlink pilot time slice DP, a guard Period GP and an uplink pilot time slice UP. In the downlink pilot time slice DP pilot signals are transmitted in the downlink DL, i.e. from base station to mobile stations, while in the uplink pilot time slice UP pilot signals are transmitted from the mobile stations to the base stations. In the guard period GP no transmissions are supposed to be made. This period is used for providing a sufficient separation between transmission and reception in the system. The guard period GP is thus an interval between uplink and downlink transmissions.

As was mentioned earlier all base station transmissions are synchronised. This means that the first and second communication structures CS1 and CS2 are in fact synchronised with each other. However, because of the delay of the signals in the further base station, the communication structure CS2 of the further base station is delayed in relation to communication structure CS1 of the first base station. What is shown in FIG. 4 is thus the communication structures CS1 and CS2 as they are being provided and perceived by the first base station. It may here be further mentioned that there is also a delay between the first and the second and third base stations. However, this delay is normally so small that it does not influence the operation of the system.

Figure 5:
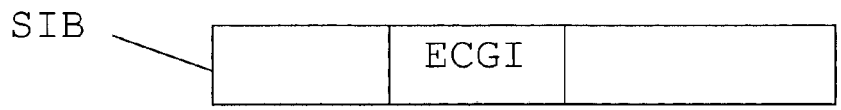

The System Information Block SIB includes an international cell identifier. In LTE this identifier is an E-UTRAN Cell Global Identifier (ECGI), where E-UTRAN is an acronym for Evolved UMTS Terrestrial Radio Access Network. SIB is in LTE more particularly carried on a physical channel, such as the Physical Downlink Shared Channel (PDSCH). The international cell identifier is specified by The Third Generation Partnership Project (3GPP) Technical Specification (TS) 36.331, which is herein incorporated by reference. The transmission of ECGI in the SIB is schematically shown in FIG. 5.

Atmospheric ducts, like the one shown in FIG. 3 may appear between the first and the further base stations 14 and 20. This means that the radio signals of the further base station 20 may be lead via this duct 42 to the first base station 14. In this case the communication structure CS2 of the further base station 20 may be delayed in relation to the communication structure CS1 of the first base station 14 in the way shown in FIG. 4. As can be seen from FIG. 4 the downlink transmissions DL of the further base station 20 may then coincide with the uplink transmissions UL to the first base station 14. This means that the first base station 14 will receive radio signals from the further base station 20 when it is supposed to receive radio signals from the mobile stations in its vicinity, like the mobile station 12. A base station transmits with a lot more power than a mobile station. This therefore means that due to the low attenuation of the transmissions of the further base station 20, these transmissions will make it more or less impossible for the first base station 14 to be able to receive any radio signals from the mobile stations in the uplink, like mobile station 12. The interference from the further base station 20 will be too high. It can here furthermore be mention that it is also possible to be interfered during uplink communication by another base station if this other base station is faulty, like if it has lost its synchronisation. The invention is provided for addressing this situation.

Figure 6:
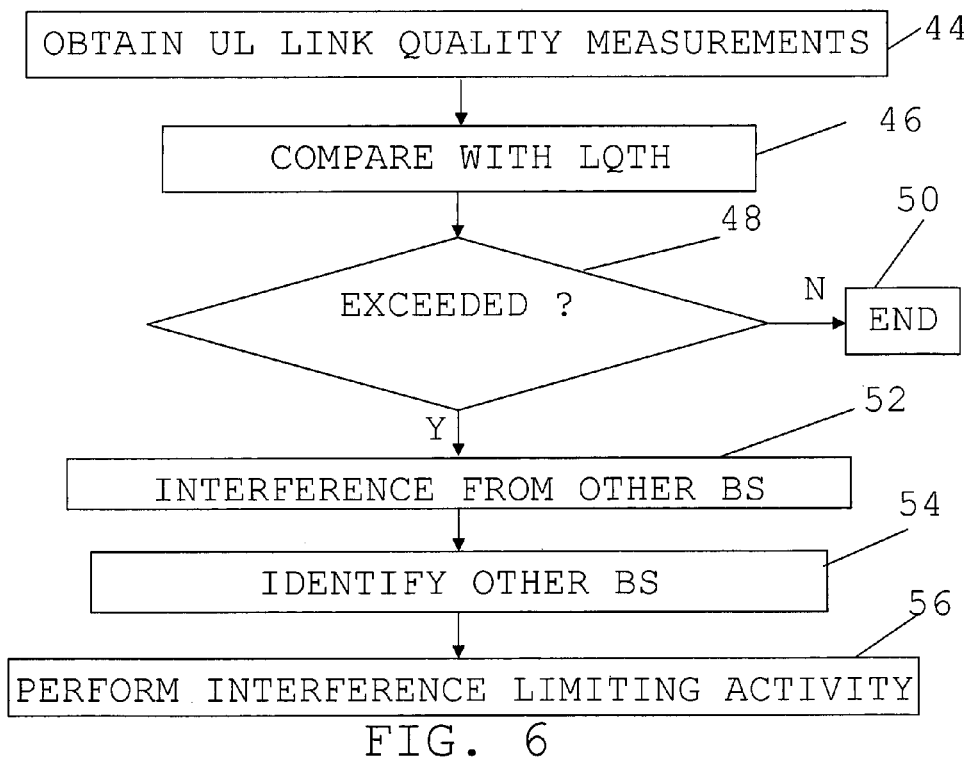
FIG. 6 shows a flow chart of a general method for handling interference in a mobile communication system according to a first embodiment of the invention being performed in the first base station.

A first embodiment of the invention will now be described with reference being made to the previous figures as well as to FIG. 6, which shows a flow chart of a general method for handling interference in a mobile communication system according to a first embodiment of the invention.

According to the first embodiment the link quality measuring element 30 of the interference investigating unit 28 in the first base station 14 obtains link quality measurements that are measured in the base station 14 during uplink communication UL between mobile stations in contact with this base station, step 44, which mobile stations comprise at least one mobile station 12. This obtaining is typically provided through the link quality measuring element 30 connecting to the radio communication unit 24 during uplink transmissions and obtaining link quality measurements such as signal to noise measurements or other equivalent measurements from the radio communication unit such as bit error rate measurements. These are typically measurements relating to one or more uplink channels in the communication structure CS1. When the link quality measuring element 30 has obtained the link quality measurements, it forwards these to the link quality evaluation element 32, which in turn compares the link quality measurements of at least one uplink channel with a link quality threshold LQTH, step 46. This threshold may be set to be higher than the best possible link quality provided by a mobile station. This means that a link quality that is better than what is normally possible will indicate an abnormal situation. The link quality evaluation element 32 thus determines if the uplink channel is interfered by another base station or not based on if the link quality threshold is exceeded or not. In case the threshold is not exceeded, step 48, i.e. a normal link quality is obtained, then the method is ended, step 50. However, in case the threshold is exceeded, step 48, the link quality evaluating element 32 determines that there is in fact interference from another base station of the uplink channel, step 52 and informs the base station indentifying element 34 of this fact. The base station identifying element 34 then identifies the other base station, step 54, which identification is made via signals, such as the System Information Block SIB being broadcast DL2 by the other base station 20. In this identification the base station identifying element 34 may communicate with the radio communication unit 24 in order to detect an identifier broadcast by the other base station. This identifier is typically a cell identifier, and with advantage a global cell identifier such as the ECGI transmitted in the System Information Block SIB. From this identifier the first base station may directly understand that the further base station is not a base station in the vicinity, such as in the first group. After this has been done, the interference limiting element 36 is informed that another base station at a far away location is interfering. The interference limiting element 36 then performs at least one interference limitation activity based on the identification, step 56. The performing of an interference limitation activity may here be that the interference limiting element 36 itself perform or order the radio communication unit 24 to perform one or more interference limitation measures. If for instance the first base station 14 learns that the further base station 20 causes the interference, it may change the guard period GP in the special subframe SF S based on the identification. From this first embodiment of the invention it can be seen that the communication interface 29 is not needed.

Figure 7:
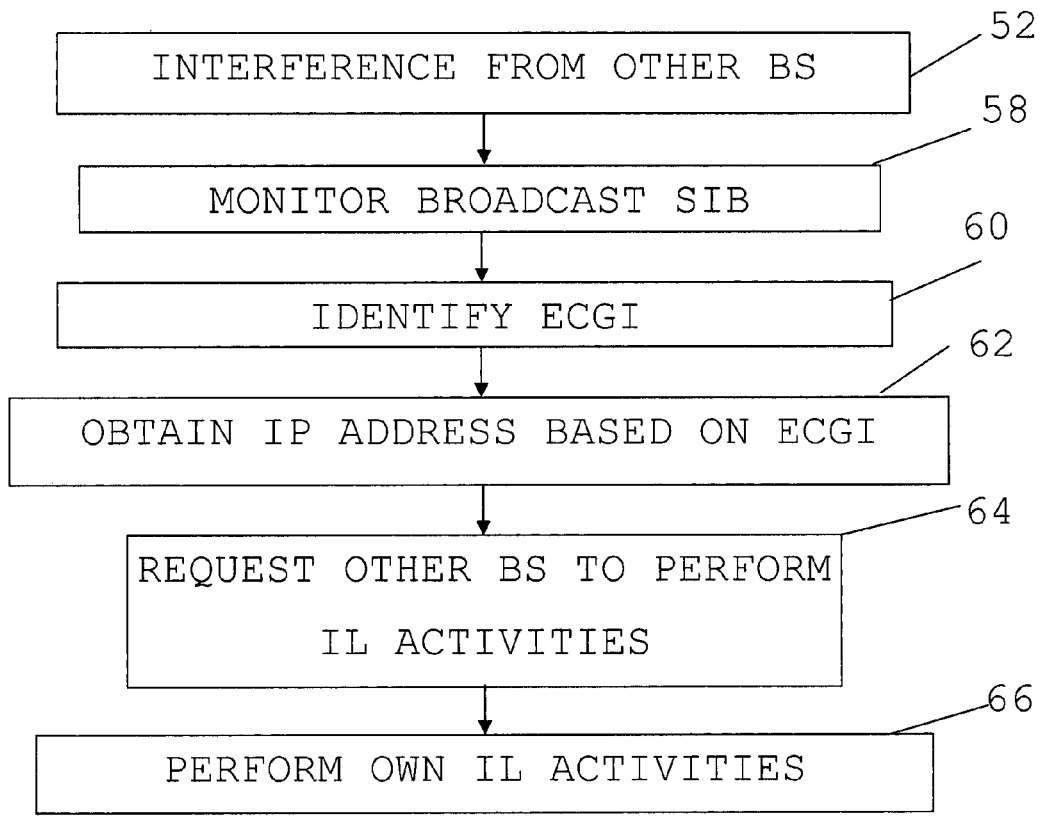
FIG. 7 shows a flow chart of a number of method steps for handling interference in a mobile communication system according to a first variation of the method.

If the threshold is exceeded, the operation of the first base station 14 can according to a first variation in more detail be performed according to the flow chart shown in FIG. 7.

In this first variation the steps 44-52 are the same as in the first embodiment and performed by the same elements. Thus, in case the link quality evaluating element 32 finds that there is interference from another base station in the Uplink, step 52, it informs the base station identifying element 34. The base station investigating element 34 may then monitor the transmissions of this base station and more particularly the broadcasting being made by the other base station, which monitoring is thus made in a part of the time division scheme allocated to uplink communication, i.e. in the Uplink UL, via the radio communication unit 24 and antenna 26. It may more particularly monitor the System Information Block SIB that is being broadcast by the interfering base station, step 58. In this monitoring of the system information block it may then furthermore identify the ECGI of this base station, step 60. ECGI is the identifier of a cell provided by a base station and therefore it is usually not enough for the first base station 14 to clearly identify the interfering base station. Above all it is normally not enough for contacting the further base station. Such contact may require a system communication identifier of the interfering base station, such as an IP address, of which the first base station is normally not aware. However, operations and maintenance devices, such as the O&M device 22 is typically aware of such data. Therefore the base station investigating element 34 may send a query regarding the identified ECGI to the O&M device 22 via the communication interface 29 and receive a system communication identifier of the further base station, here an IP address, as a response via the same interface 29. In this way the further base station 20 may be identified. Here communication is typically performed using an S1 section of the communication interface 29. Once the IP address has been obtained, step 62, the base station investigating element may inform the interference limitation element 36 and also provided this element of the obtained IP-address. The interference limitation element 36 then performs two interference limitation activities, where a first activity is to request the further base station 20 to perform at least one interference limitation measure, step

64. This may be done through sending a request for performing interference limitation measures via the communication interface 29 addressed to the further base station using the received system communication identifier. This request may be sent via an X2 section of the communication interface 29. The second activity performed by the interference limitation element 36 is that it itself performs or orders the radio communication unit 24 to perform one or more interference limitation measures, step 66.

Figure 8:
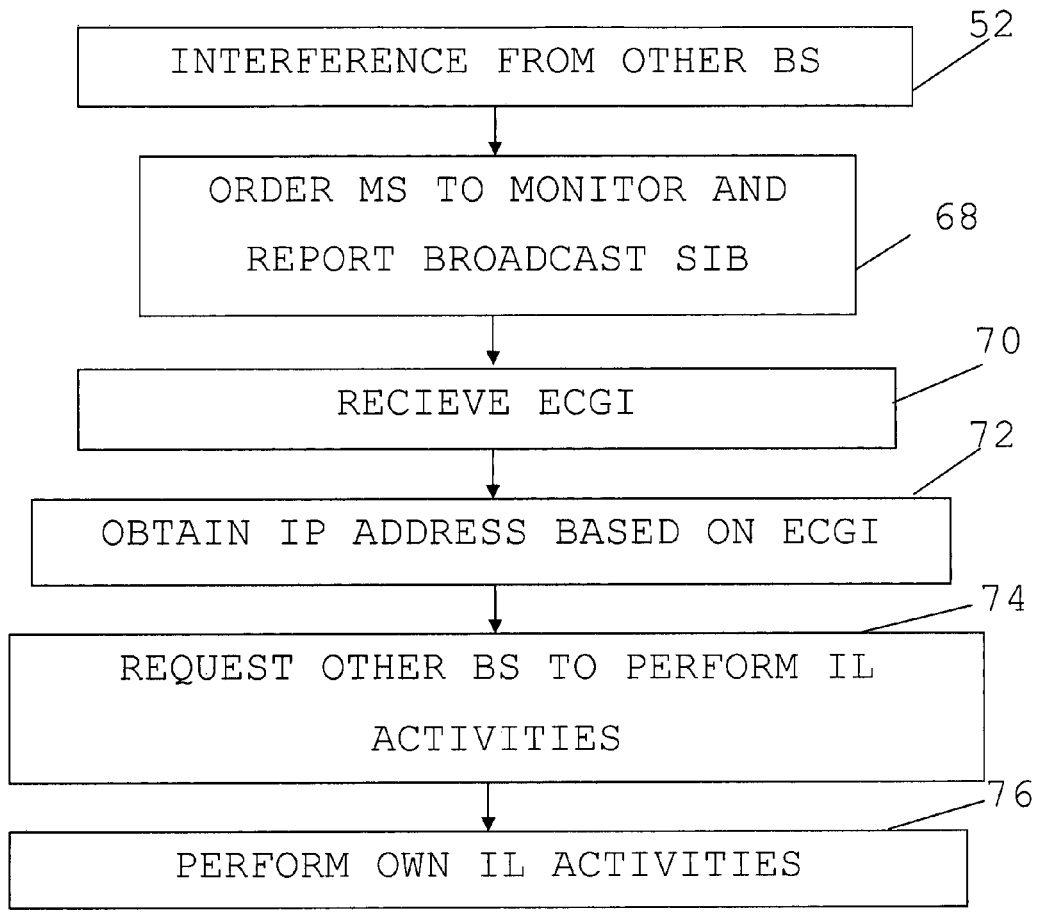
FIG. 8 shows a flow chart of a number of method steps for handling interference in a mobile communication system according to a second variation of the method, and FIG. 9 schematically shows a computer program product according to an embodiment of the invention in the form of a CD ROM disc.

It is possible that some of the transmission of the further base station is made in the downlink. The situation may especially exist that the further base station 20 transmits the ECGI in the downlink DL of the communication structure CS1 of the first base station 14. In this case the further base station is still interfering. However, in the downlink it is often not possible for the first base station to identify the interfering base station. In this case the method steps shown in FIG. 8 may be employed, which figure shows a number of method steps in a second variation of the invention.

In case the link quality evaluating element 32 finds that there is interference from another base station in the Uplink, step 52, it may then order one or more mobile stations, like the mobile station 12 to monitor the transmissions in the uplink of the further base station as well as to report broadcasts in the System Information Block SIB of the further base station 20, step 68. Such an order is normally sent to the mobile stations via the radio communication unit 24 and antenna 26. The mobile station 12 then monitors such broadcast and will then identify the ECGI. The mobile station 12 then reports the ECGI to the first base station 14, which ECGI is received by the base station identifying element 34 via the radio communication unit 24 and antenna 26, step 70. The reporting can here be made according to an automatic neighbour relation function. The base station identifying element 34 may in turn obtain a system communication identifier, here an IP address, of the interfering base station in the same way as in the first variation. After such an identifier having been obtained, the interference limitation element 36 then requests the further base station 20 to perform interference limitation measures, step 74, as well as performs own interference limitation measures, step 76.

In this way it is possible to limit uplink interference, for instance caused by atmospheric ducts, which can cause serious problems. This may also be performed using only slight modifications of existing base stations. It is therefore also easy to implement in existing systems.

In the identifying of the further base station it is possible to employ the Automatic Neighbour Relation (ANR) function, which is a feature of LTE. ECGI is a 28-bit Cell Identity value. ECGI includes Cell Identity together with 5-6 bit PLMN-Identity and it uniquely identifies a cell in E-UTRAN.

The original purpose of the ANR function is to relieve the operator from the burden of manually managing Neighbour Relations (NRs) in relation to handovers. The ANR function normally resides in the eNB and manages a conceptual Neighbour Relation Table (NRT). For each cell that the eNB has, the eNB keeps an NRT. Each NR contains a Target Cell Identifier (TCI), which identifies the target cell. For E-UTRAN, the TCI corresponds to the (ECGI) and Physical Cell Identifier (PCI) of the target cell.

In this scheme a serving base station first instructs mobile stations to perform measurements on neighbour cells. In case the first base station 14 is the serving base station providing one cell, these neighbouring cells may be provided by the second and third base station 16 and 18.

The mobile station then obtains link quality measurements as well as PCIs from the base stations having the strongest signals, which are typically the neighbours. If the target base station does not previously know this PCI, it then orders the mobile station to monitor the ECGI and report it to the target base station.

This procedure may typically be used by the first base station in order to obtain the ECGI of the further base station in both the first and second variations, where in the first variation the base station itself performs all the steps.

There are a number of different interference limitation activities that may be used apart from adjusting the guard period. It is for instance possible to adjust antenna tilt, lower down downlink power, perform Angle of Arrival (AoA) detection or adjust traffic allocation.

It should here also be mentioned that it is possible also to instruct the neighbouring base stations in the first group to perform interference limitation measures.

Figure 9:
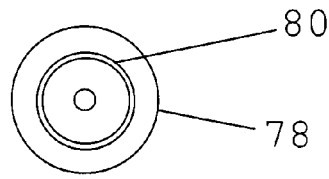

The interference investigating unit of the first base station may with advantage be provided in the form of a processor with associated program memory including computer program code for performing the functionality of the various elements. It should be realized that this unit may also be provided in the form of hardware, like for instance in the form of an Application Specific Integrated Circuit (ASIC). The computer program code may also be provided on a computer-readable means, for instance in the form of a data carrier, like a CD ROM disc or a memory stick, which will implement the function of the above-described interference investigating unit when being loaded into the above-mentioned program memory and run by the processor. One such computer program product in the form of a CD ROM disc 78 with such a computer program code 80 is schematically shown in FIG. 9.

There are a number of further variations that can be made in the system and first base station. The further base station was above described as being part of the same system as the further base station. This may not necessarily be the case. The further base station may be part of another system, however of the same type as the one in which the first base station is provided. The O&M device may then not directly know the identity of the base station based on the cell identifier, but may need to query other O&M devices in other systems. It should furthermore be realized that an ECGI is just one example of a global cell identifier that can be used according to the invention. An IP address is also just one example of a system communication identifier that can be used.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims. Furthermore, the invention is not limited to the specific order in which steps are presented in the method claims.

The invention claimed is:

1. A method for handling interference in a mobile communication system operating according to a synchronized time division scheme, the method performed in a base station of the mobile communication system and comprising:

obtaining, by the base station, link quality measurements that are measured in the base station during uplink communication between at least one mobile station and the base station;

comparing link quality measurements of at least one uplink channel with a link quality threshold;

in response to the link quality threshold being exceeded:
determining that the uplink channel is interfered by a downlink transmission by another base station, wherein the base station and the other base station are non-neighboring base stations without adjacent cells;
identifying the other base station by obtaining an identifier via signals being broadcast by the other base station; and
performing an interference limitation activity based on the identification; and wherein the mobile communications system operates according to a synchronized time division scheme.

2. The method of claim 1, wherein the identifier is a cell identifier.

3. The method of claim 2, wherein the identifier is a global cell identifier.

4. The method of claim 1, wherein the identifying comprises monitoring broadcasts being made by the other base station.

5. The method of claim 4, wherein the monitoring is performed during a part of the time division scheme allocated to uplink communication.

6. The method of claim 4, wherein the monitoring comprises ordering a mobile station to monitor and report broadcasts being made by the other base station.

7. The method of claim 6, wherein the reporting being made by the mobile station is a reporting made according to an automatic neighbor relation function.

8. The method of claim 1, wherein the performing an interference limitation activity comprises requesting the other base station to perform at least one interference limitation measure.

9. The method of claim 8, wherein one interference limitation measure is at least one of:
adjust antenna tilt;
adjust traffic allocation;
adjust downlink power; and
adjust interval between uplink and downlink transmissions.

10. The method of claim 1, wherein the mobile communication system is a time division duplexing system.

11. A base station in a mobile communication system operating according to a synchronized time division scheme and comprising:
at least one antenna;
a radio communication circuit for communicating with mobile stations of the mobile communication system via the at least one antenna;
one or more processing circuits operatively connected to the radio communications circuit and configured to function as an interference investigating circuit, the interference investigating circuit comprising:
a link quality measuring circuit configured to obtain link quality measurements that are measured in the base station during uplink communication between at least one mobile station and the base station;
a link quality evaluation circuit configured to:
compare link quality measurements of at least one uplink channel with a link quality threshold; and
in response to the link quality threshold being exceeded, determine that the uplink channel is interfered by a downlink transmission by another base station, wherein the base station and the other base station are non-neighboring base stations without adjacent cells;
a base station identifying circuit configured to identify the other base station through obtaining an identifier via signals broadcast by the other base station; and
an interference limiting circuit configured to perform an interference limitation activity based on the identification; and wherein the mobile communication system operates according to the synchronized time division scheme.

12. The base station of claim 11, wherein the identifier is a cell identifier.

13. The base station of claim 12, wherein the identifier is a global cell identifier.

14. The base station of claim 11, wherein the base station identifying circuit is configured to identify the other base station by monitoring broadcasts being made by the other base station.

15. The base station of claim 14, wherein the monitoring is performed during a part of the time division scheme allocated to uplink communication.

16. The base station of claim 11, wherein the base station identifying circuit is configured to identify the other base station through ordering a mobile station to monitor and report broadcasts being made by the other base station.

17. The base station of claim 16, wherein the base station identifying circuit is configured to identify the other base station through ordering the mobile station to report broadcasts being made by the other base station via a report made according to an automatic neighbor relation function.

18. The base station of claim 17, wherein the base station identifying circuit is configured to obtain a system communication identifier based on the broadcast identifier for use in communication with the other base station.

19. The base station of claim 11, wherein the interference limiting circuit is configured to request, when performing an interference limitation activity, the other base station to perform at least one interference limitation measure.

20. The base station of claim 19, wherein an interference limitation measure is at least one of:
adjust antenna tilt;
adjust traffic allocation;
adjust downlink power; and
adjust interval between uplink and downlink transmissions.

21. The base station of claim 11, wherein the mobile communication system is a time division duplexing system.

22. A computer program product stored in a non-transitory computer readable medium for handling interference in a mobile communication system operating according to a synchronized time division scheme, the computer program product comprising software instructions which, when run on a processor forming an interference investigating circuit of a base station, causes the interference investigating circuit to:
obtain link quality measurements that are measured in the base station during uplink communication between at least one mobile station and the base station;
compare link quality measurements of at least one uplink channel with a link quality threshold;
in response to the link quality threshold being exceeded:
determine that the uplink channel is interfered by a downlink transmission by another base station, wherein the base station and the other base station are non-neighboring base stations without adjacent cells; and identify the other base station by obtaining an identifier via signals being broadcast by the other base station; and perform an interference limitation activity based on the identification; and wherein the mobile communication system operates according to the synchronized time division scheme.

23. The method of claim 1, wherein the link quality threshold is greater than a maximum allowed link quality that is normally provided by a mobile station.

24. The method of claim 1, wherein the downlink transmission by the other base station travels through an atmospheric duct.

\* \* \* \* \*